United States Patent [19]
Kitazawa et al.

[11] Patent Number: 5,440,781
[45] Date of Patent: Aug. 15, 1995

[54] HAND-HELD CLEANER
[75] Inventors: Motoshige Kitazawa, Kodaira; Takanobu Tasaki, Ohme, both of Japan
[73] Assignee: Kioritz Corporation, Tokyo, Japan
[21] Appl. No.: 191,109
[22] Filed: Feb. 3, 1994
[30] Foreign Application Priority Data
  Feb. 5, 1993 [JP] Japan .................. 5-003036 U
[51] Int. Cl.⁶ .................................. A47L 5/24
[52] U.S. Cl. ........................ 15/344; 15/354; 15/405; 15/415.1
[58] Field of Search ............ 15/329, 330, 344, 405
[56] References Cited
U.S. PATENT DOCUMENTS

| | | | |
|---|---|---|---|
| 1,245,629 | 11/1917 | Smith | 15/330 |
| 1,801,964 | 4/1931 | Kuendig | 15/330 X |
| 1,844,728 | 2/1932 | Weber | 15/330 X |
| 2,024,367 | 12/1935 | Eriksson-Jons | 15/330 |
| 3,618,157 | 11/1971 | Bassin | 15/330 |
| 4,223,419 | 9/1990 | Sato et al. | |
| 4,325,163 | 4/1982 | Mattson et al. | |
| 4,644,606 | 2/1987 | Luerken et al. | |
| 4,694,528 | 9/1987 | Comer et al. | |
| 4,746,274 | 5/1988 | Kiyooka et al. | 15/405 X |
| 5,245,726 | 9/1993 | Rote et al. | |

Primary Examiner—Christopher K. Moore
Attorney, Agent, or Firm—Cushman, Darby & Cushman

[57] ABSTRACT

A hand-held cleaner is disclosed which is capable of performing suction operation to suck fallen leaves, refuse and the like and blowing operation to drift them together selectively with ease, and as opposed to the conventional one, which is not required to be changed in a manner of holding handles to greatly change position of a body including an engine depending upon type of operation, thereby enabling various operations to be performed easily and improved operational efficiency and manageability to be realized. The hand-held cleaner 10 comprises a blower body 10A including a prime mover 12, and a blower suction path 20 and a blower blow-off path 30 which are located on said blower body 10A in such a manner that the axis S of the former and the axis F of the latter are substantially in parallel with each other when viewed in plan, said blower suction path 20 being adapted to be rotatable.

2 Claims, 5 Drawing Sheets

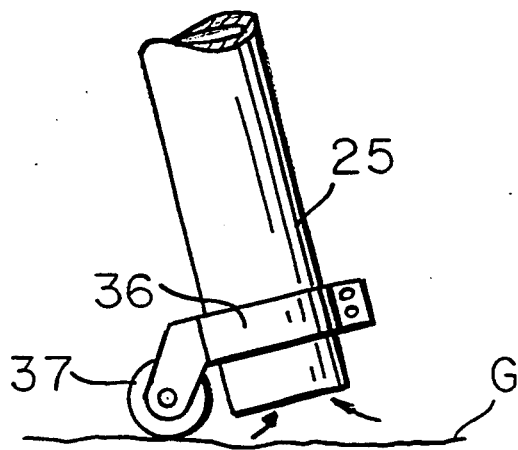
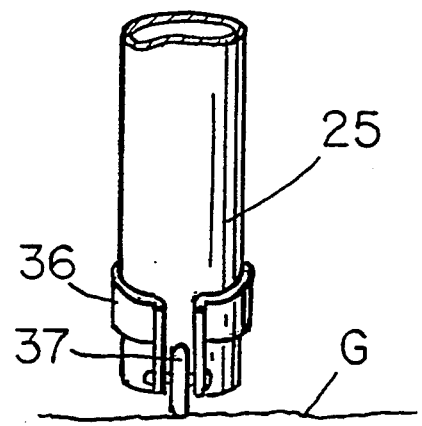
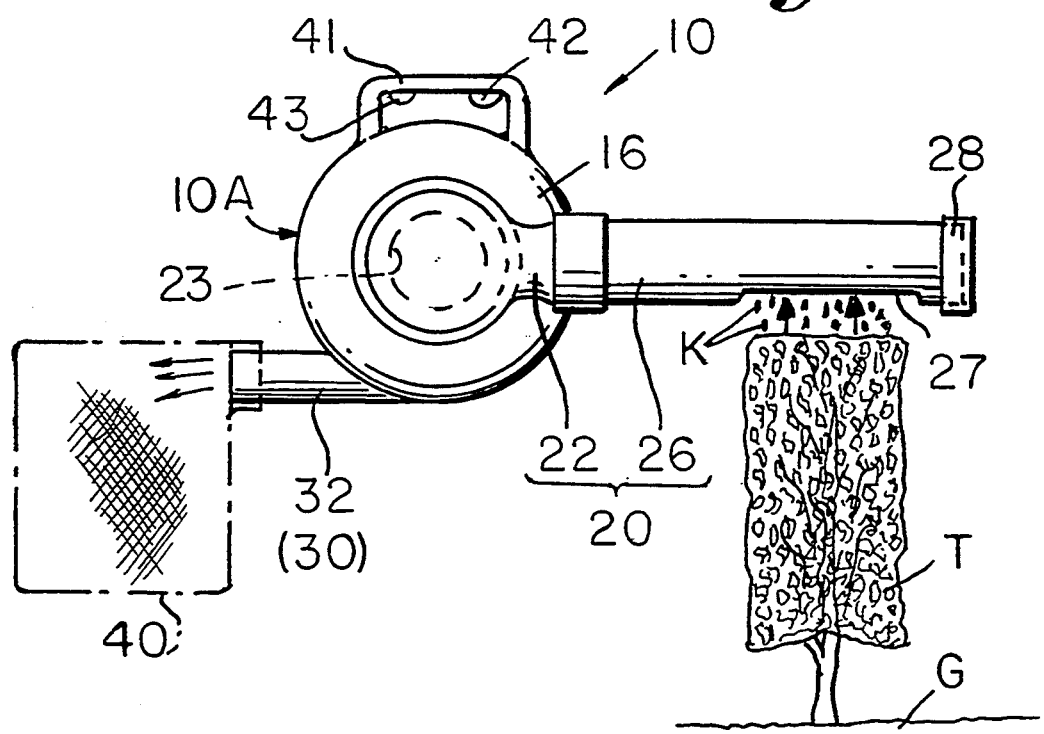

HAND-HELD CLEANER

BACKGROUND OF THE INVENTION

1. Field of the Invention

The present invention relates to a hand-held cleaner used in scavengery or the like. More particularly, it relates to a hand-held cleaner which comprises a prime mover as a power source and which is adapted to be capable of selectively performing for example, suction operation to suck fallen leaves, refuse and the like and blowing operation to drift them together.

2. Description of the Prior Art

An example of a conventional hand-held cleaner of this type is shown in FIG. 7. The hand-held cleaner 50 is shown in a condition to perform, for example, suction operation to suck fallen leaves, refuse and the like, in other words, in a condition to be used as a vacuum cleaner for scavengery. Summarily describing the structure thereof, the machine comprises a blower body 50A including an air-cooled two-cycle internal combustion engine 52 as a prime mover, a recoil starter 53 for starting the same, a fuel tank 54, a blower fan cover 56, and the like. In the cover 56, a fan of the centrifugal blower is attached to one end (front end) of a crankshaft as an output shaft of the engine 52. On the cover 56 is located a blower suction path 60 comprising a blower inlet and a suction pipe 65 detachably connected thereto. On one side of the cover 56 is, located a blower blow-off path 70 comprising a blower outlet 72 and an L-shaped blow-off pipe 75 detachably connected thereto. The windward portion (proximal end portion) of the blow-off path 70 is so formed as to gradually slant in a downward direction, and to the leeward end of the blow-off pipe 75 is attached a dust-bag 80 having an appropriate air-permeability.

A first handle 81 is formed on the top of the cover 56 in a direction perpendicular to the crankshaft, and a second handle 82 is formed in rear of the engine 52 in a direction perpendicular to the first handle 81.

It is noted that the blower suction path 60 is located coaxially with the crankshaft, and that the windward portion of the blower blow-off path 70 is located perpendicularly to the blower suction path 60 when viewed in plan.

Accordingly, when this machine is used as a vacuum cleaner for scavengery as shown in FIG. 7, in order to suck fallen leaves and the like from the distal end of the suction pipe 65, it is generally held by the first handle 81 and the second handle 82 with a left hand and a right hand respectively, in such a position that the suction pipe 65 is turned downwardly.

On the other hand, when the machine is used as a power blower, for example, for scavengery to drift fallen leaves, refuse and the like together, in general, the suction pipe 65 is removed if desired, and instead of the L-shaped blow-off pipe 75 with the dust-bag 80, for example, a blow-off pipe whose tip is flattened is attached to the outlet 72, and in order to drift leaves fallen on the ground and the like by means of air blown off from the tip of the blow-off pipe, the machine is held by the first handle 81 in such a position that the blow-off pipe is slanted down, i.e., a position that the body 50A including the engine 52 etc. is rotated by about 45° in a vertical plane relative to the position in the above-mentioned case where the machine is used as a vacuum cleaner.

As described above, such a conventional hand-held cleaner has problems in that it requires the two handles and manner of holding them must be changed according to the type of operation to change the position of the body including the engine etc., and that since the two handles protrude from the body in different directions, a handle which is not used during scavenging operation or the like is likely to make an obstacle of itself.

Further, when it is used as a vacuum cleaner for scavengery, it must be slanted or turned upwardly as a whole in order to suck withered leaves hanging on branches of trees and the like, thereby leading to poor manageability.

SUMMARY OF THE INVENTION

In view of these points, it is an object of the present invention to provide a hand-held cleaner which is adapted to be capable of selectively performing suction operation to suck fallen leaves refuse and the like and blowing operation to drift them together, and which is not required to be changed in a position of a body including in engine etc., i.e., to be changed in a manner of holding handles depending upon type of operation, thereby enabling improved operational efficiency and manageability to be realized.

To attain the above-mentioned object, the hand-held cleaner according to the present invention, as its basic form, comprises a blower body including a prime mover, and a blower suction path and a blower blow-off path which are located on the blower body in such a manner that the axis of the former and the axis of the latter are substantially in parallel with each other when viewed in plan, said blower suction path being adapted to be rotatable about the blower rotation axis.

More practically, it is desirable that at least the leeward portion of the blower suction path and at least the windward portion of the blower blow-off path be each located perpendicularly to the blower rotation axis, and that the blower suction path be adapted to be rotatable in the plane which is normal to the blower rotation axis.

It is more desirable for such a structure that the blower suction path be adapted to be lockable at any rotational position.

In the hand-held cleaner according to the present invention which is constructed as described above, the leeward portion of the blower suction path and the windward portion of the blower blow-off path are located substantially in parallel with each other, and the blower suction path is adapted to be rotatable. Accordingly, formation of only one handle on the body in parallel with both the paths which are in parallel with each other enables the hand-held cleaner to be operative enough and to be capable of selectively performing, for example, suction operation to suck fallen leaves, refuse and the like and blowing operation to drift them together, with the body held by the only one handle in common and without need to change the position of the body.

Further, since the blower suction path is adapted to be rotatable, the distal end of the blower suction path can be positioned at any intended level without need to slant or turn the body. Consequently, fallen laves and the like on a relatively high place such as a top of a hedge or a branch can be sucked with ease. Moreover, by adapting the suction path to be lockable at any intended rotational position, it is possible to perform scavengery or the like using only one hand. Furthermore, by closing the extremity of the suction pipe constituting the windward portion of the blower suction path and by forming an opening on the periphery of the suction pipe in the vicinity of the extremity, it is possible to suck trimmed leaves, fallen leaves and the like which are found on a relatively high place more easily. Consequently, extremely improved operational convenience is attained.

BRIEF DESCRIPTION THE DRAWINGS

FIG. 4a and FIG. 4b are illustrative views of the embodiment of FIGS. 1 and 2 wherein a wheel is mounted on a suction pipe;

FIG. 5 is an illustrative view of an alternative embodiment of the suction pipe;

DESCRIPTION OF THE PREFERRED EMBODIMENTS

Figure 1:
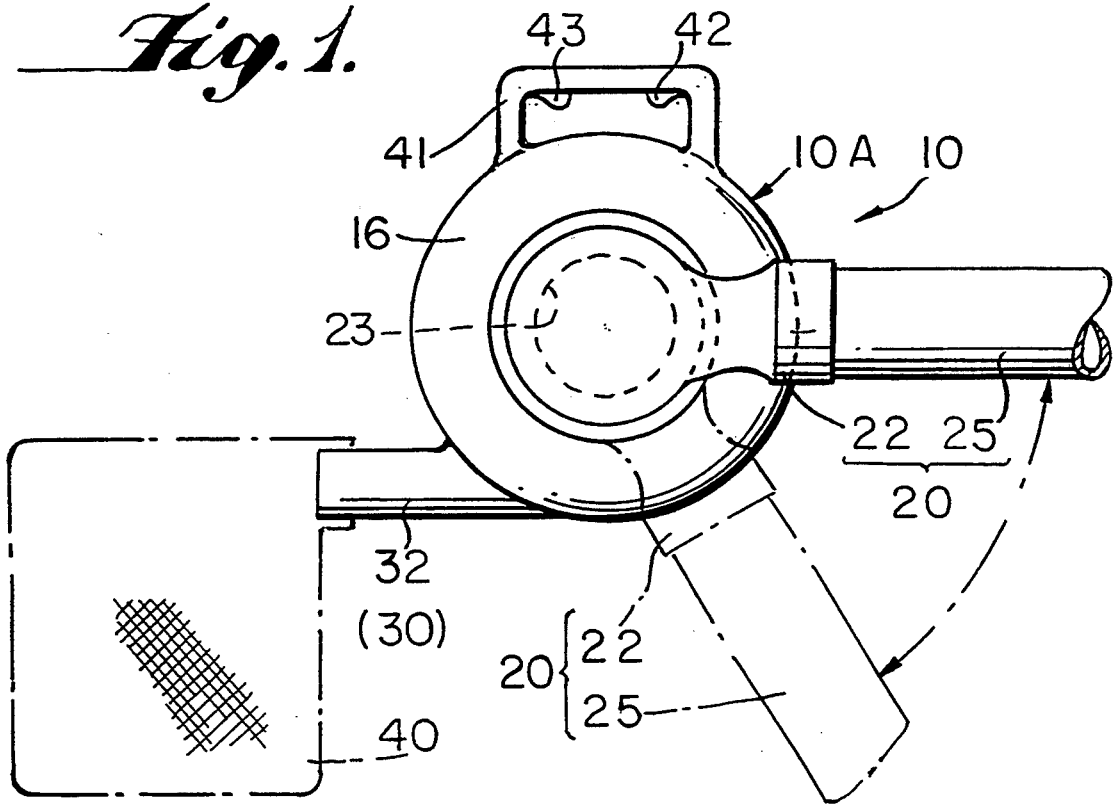
FIG. 1 is a schematic side view of one embodiment of the hand-held cleaner according to the present invention.
Figure 2:
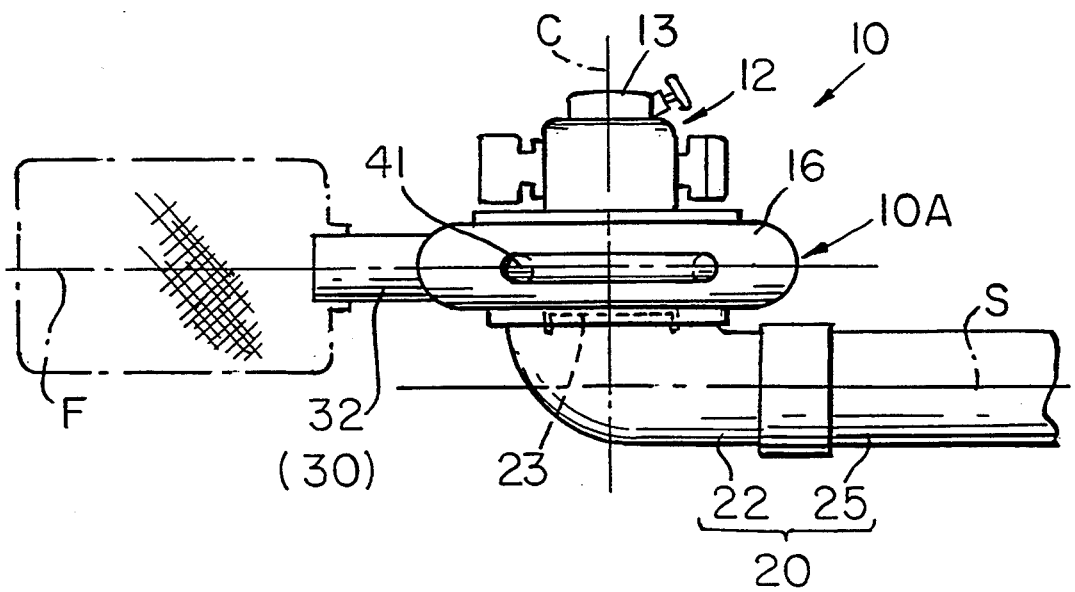
FIG. 2 is a schematic plan view of the embodiment of FIG. 1.

FIGS. 1 and 2 show one embodiment of the hand-held cleaner according to the present invention.

Figure 7:
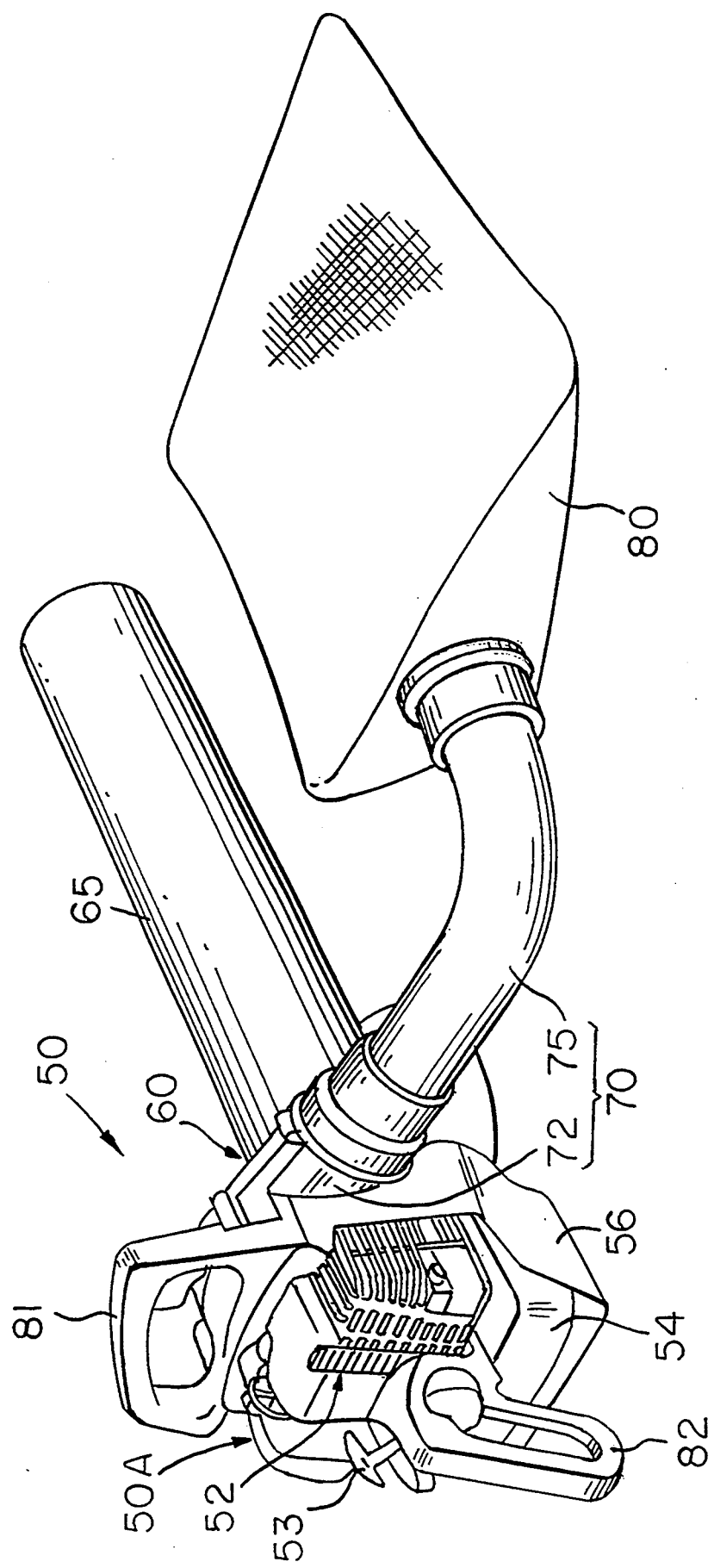
FIG. 7 is a schematic perspective view of one form of conventional hand-held cleaners.

The hand-held cleaner 10 of this embodiment is shown in a condition to perform suction operation to suck fallen leaves, refuse and the like, in other words, in a condition to be used as a vacuum cleaner for scavengery, as the above-described conventional one shown in FIG. 7. This machine 10 also comprises a blower body 10A as a main body includes an air-cooled two-cycle internal combustion engine 1 as a prime mover, a recoil starter 13 for starting the same, a blower fan cover 16, and the like. In this connection, an electric motor may be used as a prime mover.

On the cover 16 are located a rotatable L-shaped suction joint pipe 22 concentrically fitted on an inlet 23 and a suction pipe 25 detachably connected to the L-shaped suction joint pipe 22 which constitute a blower suction path 20 and an outlet 32 which constitutes a blow-off path 30 in such a manner that the suction path 20 and the blow-off path 30 are substantially in parallel with each other when viewed in plan as shown in FIG. 2. This structure will be described more in detail. In this embodiment, (the axis S of) the blower suction path 20 and (the axis F of) the blower blow-off path 30 are each located perpendicularly to (the rotation axis C of) a crankshaft of the engine 12, when viewed in plan.

Further, the leeward end of the suction joint pipe 22 of the blower suction path 20 and the blower fan cover 16 are connected mutually rotatably about the inlet 23, with a friction locking mechanism (not shown) or the like interposed therebetween. The suction joint pipe 22 and suction pipe 25 is adapted to be rotatable in the plane which is normal to the crankshaft, for example, clockwise or counterclockwise through an angle of up to 360 degrees from the horizontal position shown in FIG. 1 by the solid line, and yet, to be lockable at any rotational position within the range of the angle by means of the friction locking mechanism.

As the locking mechanism, there may be employed those having a known structure, for example, one comprising annular friction members respectively fixed to the blower fan cover 16 and the suction joint pipe 22, and a biasing member such as a spring for causing the friction members to be pressed against each other to hold the blower suction path 20 at an intended position.

In addition, on the top of the blower fan cover 16 is formed a handle 41 in parallel with the blower suction path 20 and the blower blow-off path 30, and to the distal end of the outlet 32 constituting the blower blow-off path 30 is attached a dust-bag 40 having an appropriate air-permeability.

Incidentally, for a case where the machine is used with the body 10A held in reverse, it is convenient to form throttle triggers 42, 43 at front and rear portions of the handle 41, respectively.

Figure 3:
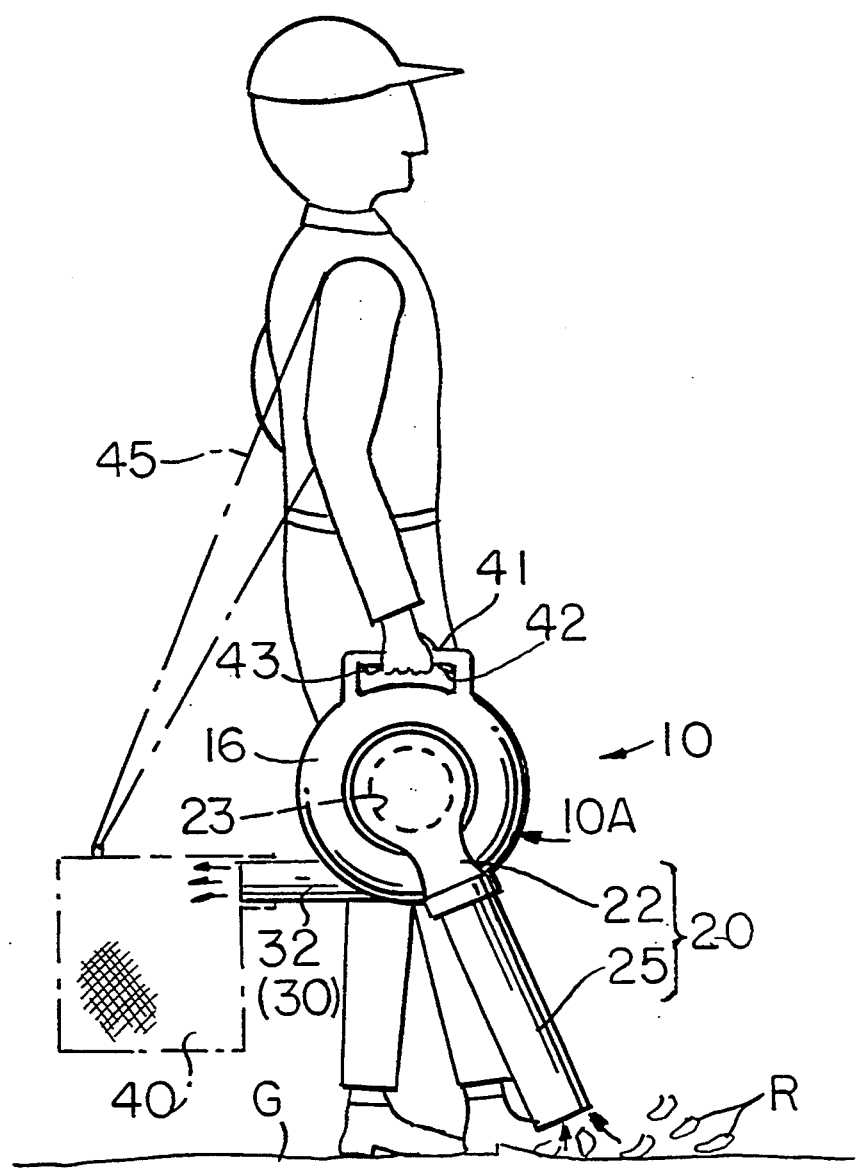
FIG. 3 is an illustrative view on one mode of use for the embodiment of FIGS. 1 and 2.

When the machine having such a structure is used as a vacuum cleaner for scavengery as shown in the drawings, it is held by the handle 41 with the suction pipe 25 turned downwardly, as shown in FIG. 2 by the double dot-broken line, to suck leaves R fallen on the ground G and the like from the distal end of the suction pipe 25 and collect them in the dust-bag 40, as shown in FIG. 3 as one mode of use.

For operation in such a mode, attachment of a wheel 37 to the lower portion of the suction path 25 by means of a clamp 36 enables an appropriate distance to be maintained between the lower end of the suction pipe 25 and the ground G, as shown in FIGS. 4a and 4b thereby leading to a more smooth operation.

On the other hand, when the machine is used as a power blower, for example, for scavengery to drift fallen leaves, refuse and the like together, the body 10A is turned by 180 degrees when viewed in plan as in FIG. 2 and held by the handle 41 with the front side back, and the suction pipe 25 is removed if desired, and a blow-off pipe having its tip flattened is mounted instead of the dust-bag 40 via a connecting member composed of, for example, a bellows-shaped flexible pipe. The machine is then held by the handle 41 with the tip of the blow-off pipe turned for- and down-wardly to drift leaves fallen on the ground and the like by means of air blown off from the tip of the blow-off pipe.

In this case, since the inlet 23 is hidden by the suction joint pipe 22, clothing of an operator is prevented from being sucked into the inlet 23.

In the hand-held cleaner 10 of this embodiment which is constructed as described above, the blower suction path 20 and the blower blow-off path 30 are located substantially in parallel with each other, and the blow, suction path 20 is adapted to be rotatable. Accordingly, formation of only one handle 41 on the body 10A in parallel with both the paths 20, 30 enables the hand-held cleaner to be operative enough and to be capable of selectively performing, for example suction operation to suck fallen leaves, refuse and the like and blowing operation to drift them together, with the body held by the only one handle 41 in common and without substantial change in a position of the body 10A.

Further since the blower suction path 20 is adapted to be rotatable, the distal end of the blower suction path 20 can be positioned at any intended level without need to slant or turn the body 10A. Consequently, fallen leaves and the like on a relatively high place can be sucked with ease.

Moreover, since the suction path 20 is adapted to be lockable at any intended rotational position, it is advantageously possible to perform scavengery or the like using only one hand.

Furthermore, when a suction pipe 26 having its extremity closed with a blank cap member 28 or the like and being formed with a suction slit 27, for example 30 cm in length and 3 cm in width, on the periphery in the vicinity of the extremity along the axial direction is used instead of the above-mentioned suction pipe 25, as shown in FIG. 5, is possible to suck trimmed leaves K, fallen leaves and the like which are found on a relatively high place such as the top of the hedge T more easily. Consequently, extremely improved operational convenience is attained.

Figure 6:
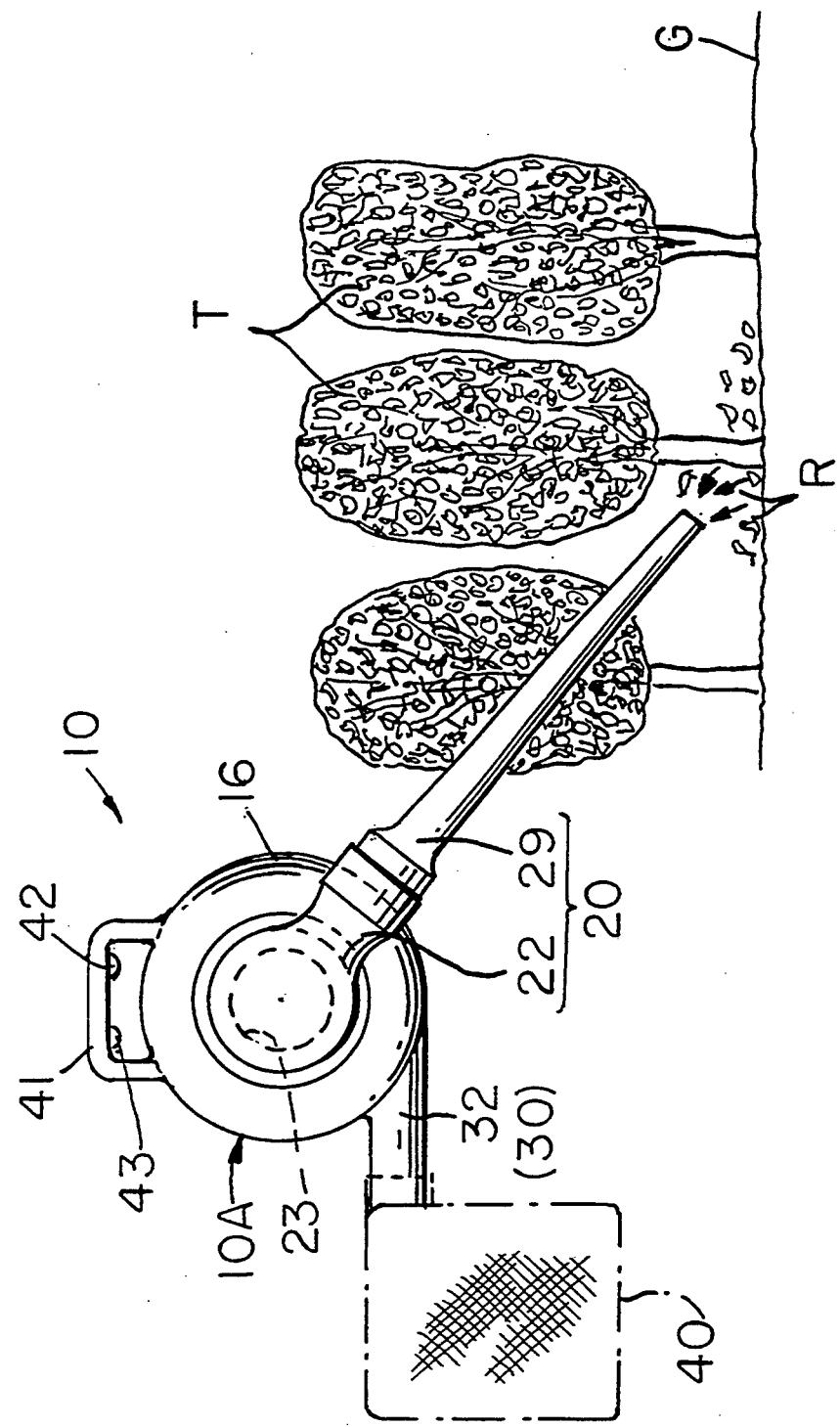
FIG. 6 is an illustrative view of another alternative embodiment of the suction pipe.

Still further, instead of the suction pipe 25 or 26, one suitable for working situation such as a tapered elongate suction pipe 29 having an extremity diameter of about 2.5 cm to 4 cm as shown in FIG. 6, a curved suction pipe, a flexible suction pipe or the like may be connected to the suction joint pipe 22, thereby enabling optimized operational efficiency to be realized according to working situation.

As is understood from the above description, according to the hand-held cleaner of the present invention, there are obtained effects that suction operation to suck fallen leaves, refuse and the like and blowing operation to drift them together can be performed selectively with ease, and that, as opposed to the conventional one, the hand-held cleaner is not required to be changed in a manner of holding handles to greatly change position of the body depending upon type of operation, thereby enabling operation to be performed easily and improved operational efficiency and manageability to be realized.

What is claimed is:

1. A hand-held cleaner comprising:
    a blower body including a prime mover and a blower fan having a horizontal rotation axis, and
    an L-shaped blower suction joint pipe and a blower blow-off outlet which are located on said blower body in such a manner that the axis of the former and the axis of the latter are substantially parallel with each other, and each are orthogonal with respect to said horizontal rotation axis, said blower suction joint pipe being constructed and arranged to be freely rotatable about said horizontal rotation axis in a vertical plane.

2. The hand-held cleaner according to claim 1, wherein to said L-shaped blower suction pipe is connected to a suction pipe having its extremity closed and being formed with a suction opening on its periphery in the vicinity of said extremity.

* * * * *